(12) United States Patent
Li (10) Patent No.: US 12,231,507 B2
(45) Date of Patent: Feb. 18, 2025

(54) METHOD AND APPARATUS FOR FLOW CONTROL

(71) Applicant: Telefonaktiebolaget LM Ericsson (publ), Stockholm (SE)

(72) Inventor: Peng Li, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 386 days.

(21) Appl. No.: 17/642,377

(22) PCT Filed: Sep. 9, 2020

(86) PCT No.: PCT/CN2020/114259
§ 371 (c)(1),
(2) Date: Mar. 11, 2022

(87) PCT Pub. No.: WO2021/047551
PCT Pub. Date: Mar. 18, 2021

(65) Prior Publication Data
US 2022/0330085 A1    Oct. 13, 2022

(30) Foreign Application Priority Data

Sep. 12, 2019 (WO) ............... PCT/CN2019/105666

(51) Int. Cl.
*H04W 4/00*       (2018.01)
*H04L 67/51*      (2022.01)
*H04L 67/565*     (2022.01)
*H04L 67/63*      (2022.01)
*H04W 28/10*      (2009.01)

(52) U.S. Cl.
CPC ............ *H04L 67/51* (2022.05); *H04L 67/565* (2022.05); *H04L 67/63* (2022.05); *H04W 28/10* (2013.01)

(58) Field of Classification Search
CPC . H04W 28/0289; H04W 24/02; H04W 88/14; H04W 88/182; H04L 67/51; H04L 67/565; H04L 67/63
See application file for complete search history.

(56) References Cited

U.S. PATENT DOCUMENTS 10,772,062 B1 *  9/2020  Albasheir ........... H04L 67/1034
10,819,636 B1 * 10/2020  Goel .................... H04L 12/2858
(Continued)

FOREIGN PATENT DOCUMENTS

CN    109600802 A    4/2019
CN    110072273 A    7/2019

OTHER PUBLICATIONS

ETSI TS 133 501 V16.3.0, Aug. 2020, Technical Specification, 5G; Security architecture and procedures for 5G System (3GPP TS 33.501 version 16.3.0 Release 16), XP055854173 (251 pages).
(Continued)

*Primary Examiner* — Atique Ahmed
(74) *Attorney, Agent, or Firm* — Sage Patent Group (57) ABSTRACT

Embodiments of the present disclosure provide methods and apparatuses for flow control. A method at a service communication proxy (SCP) comprises creating a flow table entry including a match field and an instruction field. The method further comprises applying the flow table entry to match and process a service request from a network function (NF) consumer, wherein the service request may be to be served by a NF producer.

18 Claims, 7 Drawing Sheets

(56) References Cited

U.S. PATENT DOCUMENTS

| | | | |
|---|---|---|---|
| 10,833,938 B1* | 11/2020 | Rajput | H04L 67/1095 |
| 2020/0296026 A1* | 9/2020 | Michael | H04L 43/08 |
| 2020/0296606 A1* | 9/2020 | Mendoza | H04L 41/12 |
| 2021/0067480 A1* | 3/2021 | Goel | H04L 61/4511 |
| 2021/0067485 A1* | 3/2021 | Goel | H04L 61/4511 |
| 2021/0258788 A1* | 8/2021 | Bykampadi | H04W 12/084 |
| 2021/0377097 A1 | 12/2021 | Wang | |
| 2021/0392522 A1* | 12/2021 | Wang | H04W 24/04 |

OTHER PUBLICATIONS

International Search Report and Written Opinion dated Dec. 1, 2020 in International Application No. PCT/CN2020/114259 (10 pages).
Deutsche Telekom AG, "Introduction of indirect communication between NF services, and implicit discovery", 3GPP TSG-SA2 Meeting #131, S2-1902862, Feb. 25, 2019 (18 pages).
3GPP TS 29.510 V16.0.0, Jun. 2019, 3rd Generation Partnership Project; Technical Specification Group Core Network and Terminals; 5G System; Network Function Repository Services; Stage 3 (Release 16) (135 pages).
3GPP TS 23.502 V16.1.1, Jun. 2019, 3rd Generation Partnership Project; Technical Specification Group Services and System Aspects; Procedures for the 5G System; Stage 2 (Release 16) (495 pages).
3GPP TS 23.501 V16.1.0, Jun. 2019, 3rd Generation Partnership Project; Technical Specification Group Services and System Aspects; System Architecture for the 5G System; Stage 2 (Release 16) (368 pages).

* cited by examiner

METHOD AND APPARATUS FOR FLOW CONTROL

CROSS REFERENCE TO RELATED APPLICATION(S)

This application is a 35 U.S.C. § 371 National Stage of International Patent Application No. PCT/CN2020/114259, filed Sep. 9, 2020, which claims priority to PCT/CN2019/105666, filed Sep. 12, 2019. The above-identified applications are incorporated by this reference.

TECHNICAL FIELD

The non-limiting and exemplary embodiments of the present disclosure generally relate to the technical field of communications, and specifically to methods and apparatuses for flow control.

BACKGROUND

This section introduces aspects that may facilitate a better understanding of the disclosure. Accordingly, the statements of this section are to be read in this light and are not to be understood as admissions about what is in the prior art or what is not in the prior art.

In third Generation Partnership Project (3GPP) TS 23.501 V16.1.0, the disclosure of which is incorporated by reference herein in its entirety, a service communication proxy (SCP) as a network element is introduced in a service framework. Routing of the service based interface (SBI) messages for network function (NF) interaction mechanisms may be direct as shown in model A and model B of FIG. 1, or indirect in model C and model D of FIG. 1. In case of indirect communication, the SCP is employed by the NF service consumer. The SCP routes messages between NF service consumers and NF service producers and may do discovery and associated selection of the NF service producer on behalf of a NF service consumer.

Figure 1:
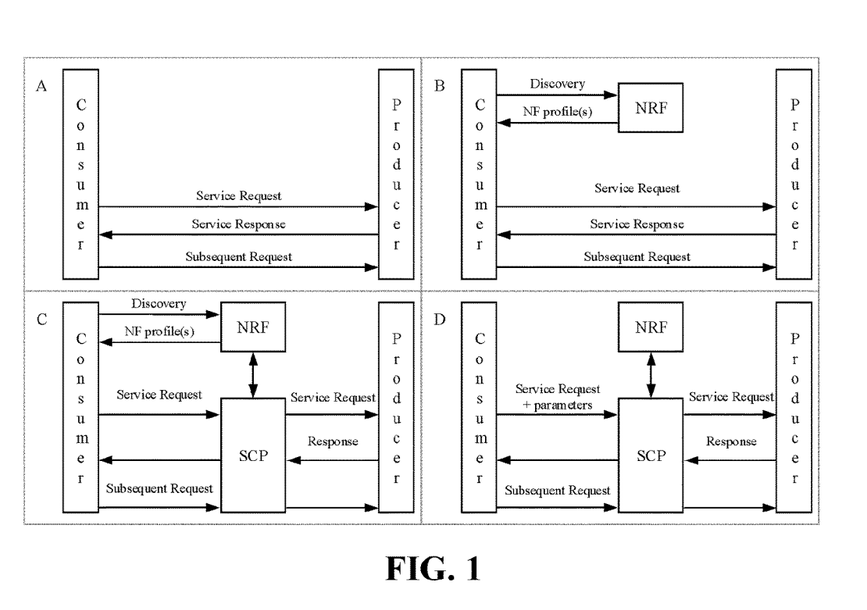
FIG. 1 schematically shows communication models for NF/NF services interaction.

As shown in FIG. 1, Model A—Direct communication without network repository function (NRF) interaction: neither NRF nor SCP are used. NF consumers are configured with NF producers' "NF profiles" and directly communicate with a producer of their choice.

Model B—Direct communication with NRF interaction: NF consumers do discovery by querying the NRF. Based on a discovery result, the NF consumers do the selection. The NF consumers may send a request to the selected NF producer.

Model C—Indirect communication without delegated discovery: NF consumers do discovery by querying the NRF. Based on a discovery result, the NF consumers do the selection of an NF Set or a specific NF instance of NF instance set. The NF consumers send a request to the SCP containing the address of the selected service producer pointing to a NF service instance or a set of NF service instances. In the latter case, the SCP selects an NF service instance. If possible, the SCP interacts with the NRF to get selection parameters such as location, capacity, etc. The SCP routes the request to the selected NF service producer instance.

Model D—Indirect communication with delegated discovery: NF consumers do not do any discovery or selection. The NF consumers add any necessary discovery and selection parameters required to find a suitable producer to the service request. The SCP uses the request address and the discovery and selection parameters in the request message to route the request to a suitable producer instance. The SCP can perform discovery with an NRF and obtain a discovery result.

As described in clause 6.2.19 of 3GPP TS 23.501 V16.1.0, the SCP may include one or more of the following functionalities. Some or all of the SCP functionalities may be supported in a single instance of an SCP:
Indirect Communication.
Delegated Discovery.
Message forwarding and routing to destination NF/NF service.
Communication security (e.g. authorization of the NF Service Consumer to access the NF Service Producer API (Application Program Interface)), load balancing, monitoring, overload control, etc.
Optionally interact with other entity, e.g. UDR (Unified Data Repository), to resolve the UDM (Unified Data Management) Group ID (identifier)/UDR Group ID/AUSF (Authentication Server Function) Group ID/PCF (Policy Control Function) Group ID based on UE (user equipment) identity, e.g. SUPI (Subscription Permanent Identifier).

In a fifth generation system (5GS), the SCP can be deployed in a distributed, redundant, and/or scalable way. SCPs can be deployed at a PLMN (public land mobile network) level, a shared-slice level and/or a slice-specific level.

In one indirect communication between an NF consumer and an NF producer, there may be more than one SCP could be present in the communication path between NF services. Each SCP works as a standalone unit, and it makes the SBI message routing decision by itself based on the information via NRF querying.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In current 5GS architecture, there are some problems. For example, the SCP is treated as a network element, and the SCP cannot find each other in current 5GS architecture. There is no way for the SCP to collaborate with each other, to secure an end to end routing in best way.

As a forwarding proxy, the SCP may need to connect to all NE producers. That means one NE producer could be connected and monitored by multiple SCPs. There may be a lot of redundancy link connections, and heart beat related messages may be cost expensive.

For a cloud network, programmability may be important for network operation. When the SCP is working as an independent unit, there is no open interface for orchestration and management.

The signaling routing could be service based selection. However for some service such as latency sensitive service, it is required to set a path fulfilling certain quality of service requirements for example to reduce hops to secure the end to end latency.

To overcome or mitigate at least one above mentioned problems or other problems or provide a useful solution, the embodiments of the present disclosure propose an improved flow control solution.

In an embodiment, SCP provides a flow control service (i.e. provides the API for SBI message forwarding control), which is used to create, update and delete routing policies (such as flow table entries). SCP may include one or more flow table entries, which perform NF producer lookups and SBI message routing selection.

In an embodiment, the flow table entry may be used to match and process packets. The flow table entry may contain a set of match fields for matching packets, a priority field for matching precedence, and a set of instruction fields to apply.

In an embodiment, the flow table entry may include one or more match fields. It can be used to match SBI messages. The match fields can match various HTTP header fields, such as the discovery and selection parameters carried in the HTTP header. The match fields can also be attributes of the NF consumer or NF producer, such as locality, NF-type NE consumer. The match fields also can be a time range such as busy hour (8 am-10 am).

In an embodiment, the flow table entry may include a priority field for matching precedence of the flow entry.

In an embodiment, the flow table entry may include one or more instruction fields which may include a set of actions that apply policies to the processing of incoming requests. Some examples of actions might be adding preferred-locality for NE instance selection; replacing request URI with service entry URI; or dropping request due to overload, disaster etc.

In an embodiment, the flow table entry may include timeout field indicating maximum amount of time or idle time before the flow table entry is expired by the SCP.

In a first aspect of the disclosure, there is provided a method at a service communication proxy (SCP). The method comprises creating a flow table entry including a match field and an instruction field. The method further comprises applying the flow table entry to match and process a service request from a network function (NF) consumer. The service request may be to be served by a NF producer.

In an embodiment, the match field may include at least one of one or more discovery and selection parameters for discovering and selecting a NF service producer instance; one or more service based interface (SBI) request headers; one or more attributes of the NF consumer and/or the NF producer; or a time range.

In an embodiment, the one or more attributes of the NF consumer and/or the NF producer may include at least one of NF locality; NF capacity; NF load; or NF type.

In an embodiment, the instruction field may include a set of actions that apply at least one policy to the processing of the service request.

In an embodiment, the set of actions may include at least one of selecting a signaling path for the service request based on at least one of end to end latency, locality, time range, service based interface (SBI) message priority, or slice information; replacing a uniform resource identifier (URI) of the service request with a URI of a service entry of the NF producer; or replacing an address of the NF producer with an address of an equivalent NF producer.

In an embodiment, replacing an address of the NF producer with an address of an equivalent NF producer may comprise replacing an address of the NF producer in a first data center with an address of another NF producer in a second data center, wherein the NF producer and said another NF producer belong to a same NF set; or replacing an address of the NF producer with high traffic load with an address of another NF producer with low traffic load.

In an embodiment, the service entry may be a resource of another SCP to configure how said another SCP as a portal to route the service request to a selected NF producer.

In an embodiment, information regarding the service entry may be added to said another SCP profile stored on a network repository function (NRF).

In an embodiment, the service entry acts as a portal to anchor the service request to a specific NF set or NF service set or a specific NF or NF service instance.

In an embodiment, the flow table entry further may include a priority field and/or a time out field indicating maximum amount of time or idle time before the flow table entry may be expired.

In an embodiment, the method may further comprise receiving a request for creating the flow table entry from a network node.

In an embodiment, the network node may include the NF consumer or a network data analytics function (NWDAF).

In an embodiment, the SCP's profile may be stored in a network repository function (NRF).

In an embodiment, the SCP may be a service entry of another NF set, and the method may further comprise receiving a service request towards to the service entry of another NF set; and forwarding the service request to a final NF service producer based on a policy of the service entry of another NF set.

In a second aspect of the disclosure, there is provided a method a network function (NF). The method comprises determining to create a flow table entry including a match field and an instruction field in a service communication proxy (SCP). The flow table entry may be used to match and process a service request from a NF consumer. The service request is to be served by a NF producer. The method further comprises sending a request for creating the flow table entry to the SCP.

In an embodiment, the NF may include the NF consumer or a network data analytics function (NWDAF).

In an embodiment, the NF may send the request for creating the flow table entry may in response to detecting all the NF producers in a data center is down.

In an embodiment, the method may further comprise discovering the SCP via the NRF.

In another aspect of the disclosure, there is provided an apparatus at a service communication proxy (SCP). The apparatus comprises a processor; and a memory coupled to the processor, said memory containing instructions executable by said processor, whereby said apparatus is operative to create a flow table entry including a match field and an instruction field. Said apparatus is further operative to apply the flow table entry to match and process a service request from a network function (NF) consumer. The service request is to be served by a NF producer.

In another aspect of the disclosure, there is provided an apparatus at a network function (NF). The apparatus comprises a processor; and a memory coupled to the processor, said memory containing instructions executable by said processor, whereby said apparatus is operative to determine to create a flow table entry including a match field and an instruction field in a service communication proxy (SCP). The flow table entry is used to match and process a service request from a NF consumer. The service request is to be served by a NF producer. Said apparatus is further operative to send a request for creating the flow table entry to the SCP.

In another aspect of the disclosure, there is provided SCP. The SCP comprises a creating module and an applying module. The creating module may be configured to create a flow table entry including a match field and an instruction field. The applying module may be configured to apply the flow table entry to match and process a service request from a network function (NF) consumer. The service request is to be served by a NF producer.

In another aspect of the disclosure, there is provided an NF. The NF comprises a determining module and a sending module. The determining module may be configured to determine to create a flow table entry including a match field and an instruction field in a service communication proxy (SCP). The flow table entry is used to match and process a service request from a NF consumer. The service request is to be served by a NF producer. The sending module may be configured to send a request for creating the flow table entry to the SCP.

In another aspect of the disclosure, there is provided a computer-readable storage medium storing instructions which when executed by at least one processor, cause the at least one processor to perform the method according to the first aspect of the disclosure.

In another aspect of the disclosure, there is provided a computer program product, comprising instructions which, when executed on at least one processor, cause the at least one processor to carry out the method according to the first aspect of the disclosure.

In another aspect of the disclosure, there is provided a computer-readable storage medium storing instructions which when executed by at least one processor, cause the at least one processor to perform the method according to the second aspect of the disclosure.

In another aspect of the disclosure, there is provided a computer program product, comprising instructions which, when executed on at least one processor, cause the at least one processor to carry out the method according to the second aspect of the disclosure.

Many advantages may be achieved by applying the proposed solution according to embodiments of the present disclosure. For example, some embodiments of the present disclosure can make the entire signaling network to be programmable and make the SBI message routing to be performed based on policies (such as flow table entry). Some embodiments of the present disclosure can bring a possibility to optimize message routing according pre-defined policy (such as flow table entry), that is, more than the selection of the target NF producer, but the message delivery path. Some embodiments of the present disclosure can select the signaling path according to end to end latency, locality, busy hour, slice, etc. Some embodiments of the present disclosure can make independent SCP units connected to each other and perceive each other. Some embodiments of the present disclosure can make SCPs to collaborate to achieve optimal routing. Some embodiments of the present disclosure can increase the resilience of network. In some embodiments of the present disclosure, in the case of congestion or failure etc., the signaling sent by the NF consumer can be redirected to the equivalent target without NF consumer/producer intervention. In some embodiments of the present disclosure provide non-intrusive overload protection via change the flow of SBI messages (e.g. re-select the equivalent target NF producer) to avoid congestion. Some embodiments of the present disclosure can transparently perform system migration and expansion for other nodes in the network.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable communication standards such as new radio (NR). In the following description, the terms "network" and "system" can be used interchangeably. Furthermore, the communications between two devices in the network may be performed according to any suitable communication protocols, including, but not limited to, the communication protocols as defined by a standard organization such as 3GPP. For example, the communication protocols may comprise the fifth generation (5G) communication protocols, and/or any other protocols either currently known or to be developed in the future.

The term "network device" or "network node" used herein refers to a network entity such as a core network device in a communication network. For example, in a wireless communication network such as a 3GPP-type cellular network, the network node may implement various network functions, which may offer numerous services to customers who are interconnected by an access network device. Each access network device is connectable to the core network device over a wired or wireless connection.

The term "network function (NF)" refers to any suitable function which can be implemented in a network node (physical or virtual) of a communication network. For example, the 5G system (5GS) may comprise a plurality of NFs such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function) and NRF (NF Repository Function), (R)AN ((radio) access network), SCP (service communication proxy), etc. In other embodiments, the network function may comprise different types of NFs for example depending on a specific type of network.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (Val)) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (TOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, the NE consumer may be any suitable NF or NF instance which needs to use one or more services provided by another NE. The NE producer may be any suitable NF or NF instance which can provide one or more services to one or more NF consumers. For example, NRF can provide service discovery function to any other NE instance or SCP. In this case, NRF is the NF producer and said any other NE instance or SCP is the NF consumer. As another example, if an NF can provide one or more services to any other NFs, it will register its NF profile in the NRF. In this case the NF is the NF consumer of NRF and the NF producer of said any other NFs.

As used herein, SCP can register, de-register, and update its profile in NRF, e.g. similar as an NF. An NE consumer can discover the appropriate SCP(s) for different purpose via NRF. To make SCP to register itself into NRF. SCP can register, de-register, update its profile in NRF, e.g. similar as an NF. The profile of SCP may include its function/feature capability, deployment topology, and/or query parameters for discovery. For example, the parameters can be locality of SCP, the capacity, the priority etc. NF consumer can discover the appropriate SCP(s) for different purpose. For example, to find a default forwarding proxy in the same data center. The NF consumer can use the locality as query parameter to do discovery. NF consumer can subscribe interested SCP(s) status, and can take action based on status notification. For example, NF consumer can change to a new SCP when the previous serving SCP is down, or busy etc.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

Figure 2:
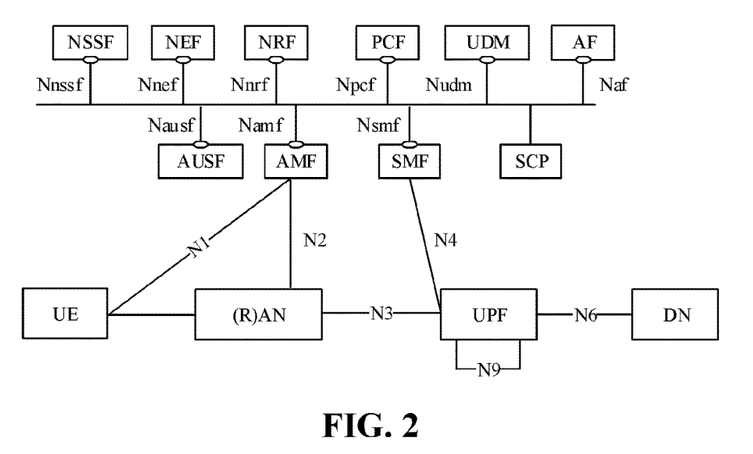
FIG. 2 schematically shows a high level architecture in the next generation network.

Although the subject matter described herein may be implemented in any appropriate type of system using any suitable components, the embodiments disclosed herein are described in relation to a communication system complied with the exemplary system architecture illustrated in FIG. 2. For simplicity, the system architecture of FIG. 2 only depicts some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

FIG. 2 schematically shows a high level architecture in the next generation network such as 5G. The system architecture of FIG. 2 may comprise some exemplary elements such as AUSF, AMY, DN (data network), NEF, NRF, NSSF, PCF, SMF, UDM, UPF, AF, UE (user equipment), (R)AN, SCP, etc.

In accordance with an exemplary embodiment, the UE can establish a signaling connection with the AMF over the reference point N1, as illustrated in FIG. 2. This signaling connection may enable NAS (Non-access stratum) signaling exchange between the UE and the core network, comprising a signaling connection between the UE and the (R)AN and the N2 connection for this UE between the (R)AN and the AMF. The (R)AN can communicate with the UPF over the reference point N3. The UE can establish a packet data unit (PDU) session to the DN (data network, e.g. an operator network or Internet) through the UPF over the reference point N6.

As further illustrated in FIG. 2, the exemplary system architecture also contains the service-based interfaces such as Nnrf, Nnef, Nausf, Nudm, Npcf, Namf and Nsmf exhibited by NFs such as the NRF, the NEF, the AUSF, the UDM, the PCF, the AMF and the SMF. In addition, FIG. 2 also shows some reference points such as N1, N2, N3, N4, N6 and N9, which can support the interactions between NF services in the NFs. For example, these reference points may be realized through corresponding NF service-based interfaces and by specifying some NF service consumers and providers as well as their interactions in order to perform a particular system procedure.

Various NFs shown in FIG. 2 may be responsible for functions such as session management, mobility management, authentication, security, etc. The AUSF, AMF, DN, NEF, NRF, NSSF, PCF, SMF, UDM, UPF, AF, UE, (R)AN, SCP may include the functionality for example as defined in clause 6.2 of 3GPP TS23.501 V16.1.0. For example, the NRF may support the following functionality: supporting service discovery function, for example receiving NF discovery request from NF instance or SCP, and providing the information of the discovered NF instances (be discovered) to the NF instance or SCP; maintaining the NF profile of available NF instances and their supported services; NF specific service authorization information; etc. The SCP address may be locally configured in the NF service consumer or be discovered via NRF when the SCP profile is stored and/or registered in NRF.

Figure 3:
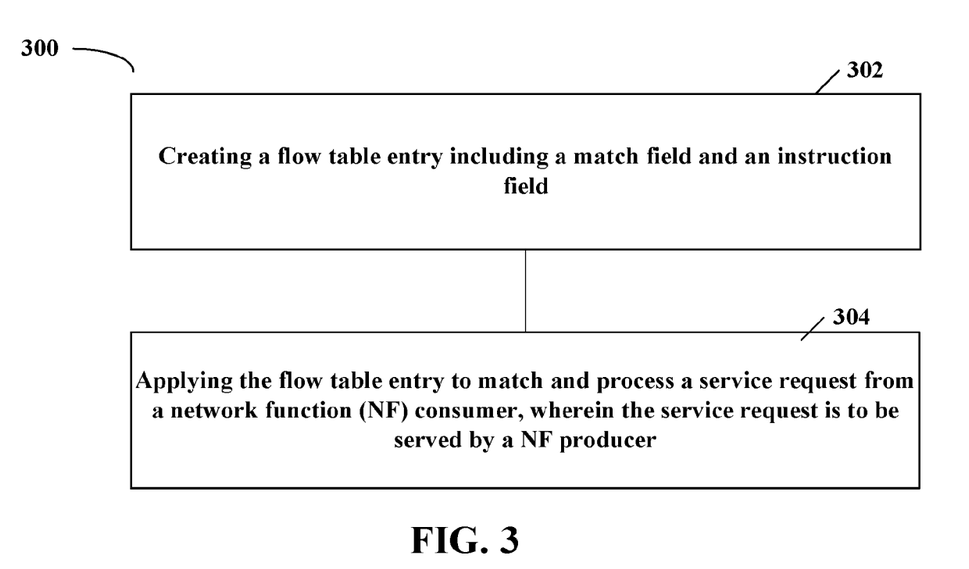
FIG. 3 shows a flowchart of a method according to an embodiment of the present disclosure.

FIG. 3 shows a flowchart of a method according to an embodiment of the present disclosure, which may be performed by an apparatus implemented in/at or communicatively coupled to a SCP. As such, the apparatus may provide means for accomplishing various parts of the method 300 as well as means for accomplishing other processes in conjunction with other components.

At block 302, the SCP creates a flow table entry including a match field and an instruction field. The SCP may provide service communication proxy function similar to the SCP as described in clause 6.2.19 of 3GPP TS 23.501 V16.1.0. In other embodiments, the SCP may be any suitable service communication proxy in other communication network. The SCP may be triggered to create the flow table entry in various ways. For example, the SCP may create the flow table entry when receiving a request to create the flow table entry from a network node such as a NF consumer (for example a network data analytics function, etc.). The SCP may create the flow table entry for a service request when receiving the service request from a NF service consumer and there is not a matched flow table entry in the SCP. The SCP may create the flow table entry when it determines to create the flow table entry for example due to various events such as load balance or link failure or network node failure or quality of service (QoS) requirement, etc. The SCP may create the flow table entry in advance for example when the SCP is added to the network or recovered from failure or waken up from a sleep state, etc.

The match field can include one or more match parameters for matching the service request from an NF service consumer or another SCP. For example, the match fields can match various Hyper Text Transfer Protocol (HTTP) header fields of the service request, such as the discovery and selection parameters carried in the HTTP header. The match fields can be attributes of the NF consumer or the NF producer, such as locality and/or an NF type (such as NT consumer). The match fields can be a time range such as busy hour (8 am-10 am). The locality can be used by the SCP to determine whether the target NF producer is in an area (such as a data center) of the NF consumer. The locality of the NF producer and NF consumer can be found via NRF, due to those locality information is part of their profile.

In an embodiment, the match field may include at least one of one or more discovery and selection parameters for discovering and selecting a NF service producer instance; one or more attributes of the NF consumer and/or the NF producer; one or more service based interface (SBI) request headers; or a time range.

The discovery and selection parameters may be similar to the discovery and selection parameters included in the service request sent to the SCP in 5GS. In other communication system, the discovery and selection parameters may be other suitable parameters for discovering and selecting a NF service producer instance. For example, in 5GS, when the NF service consumer intends to communicate with an NF service producer, the NF service consumer sends the service request to the SCP. The service request may include discovery and selection parameters necessary to discover and select the NF service producer instance. The discovery and selection parameters may be included in the service request by the NF service consumer in a way that the SCP does not need to parse the request body. The SCP may perform discovery upon the request either by interacting with an NRF using Nnrf_NFDiscovery service or may use information collected during the previous interactions with an NRF (by the Nnrf_NFDiscovery service or Nnrf_NF-Management_NFStatusNotify service operation).

The one or more attributes of the NF consumer and/or the NF producer may include any suitable attributes such as the information included in the NF consumer profile and/or the NF producer profile. For example, the attributes may include at least one of following information as described in clause 6.2.6 of 3GPP TS 23.501 V16.1.0:

NF instance ID.
NF type.
PLMN ID.
Network Slice related Identifier(s) e.g. S-NSSAI (Single Network Slice Selection Assistance Information), NSI ID (Network Slice Instance Identifier).
FQDN (Fully Qualified Domain Name) or IP (Internet protocol) address of NF.
NF capacity information.
NF priority information.
NF Set ID.
NF Service Set ID of the NF service instance.
NF Specific Service authorization information.
if applicable, Names of supported services.
Endpoint Address(es) of instance(s) of each supported service.
Identification of stored data/information.
Other service parameter, e.g., DNN (Data Network Name), notification endpoint for each type of notification that the NF service is interested in receiving.
Location information for the NF instance, examples of such information can be geographical location, data center.
TAI(s) (Tracking Area Identity).
NF load information.
Routing Indicator, for UDM and AUSF.
One or more GUAMI(s) (Globally Unique AMF Identifier), in case of AMF.
SMF area identity(ies) in case of UPF.
UDM Group ID, range(s) of SUPIs, range(s) of GPSIs (Generic Public Subscription Identifier), range(s) of external group identifiers for UDM.
UDR Group ID, range(s) of SUPIs, range(s) of GPSIs, range(s) of external group identifiers for UDR.
AUSF Group ID, range(s) of SUPIs for AUSF.
PCF Group ID, range(s) of SUPIs for PCF.
HSS(Home Subscriber Server) Group ID, set(s) of IMPIs, set(s) of IMPU, for HSS.
Analytics ID, in case of NWDAF (network data analytics function).
AF's Event ID(s), in case of NEF.
PLMN level (the NRF is configured with information for the whole PLMN),
shared-slice level (the NRF is configured with information belonging to a set of Network Slices),
slice-specific level (the NRF is configured with information belonging to an S-NSSAI).
the NRF(s) in the Visited PLMN (known as the vNRF) configured with information for the visited PLMN.
the NRF(s) in the Home PLMN (known as the hNRF) configured with information for the home PLMN, referenced by the vNRF via the N27 interface.

In an embodiment, the one or more attributes of the NF consumer and/or the NF producer may include at least one of NF locality; NF capacity; NF load; or NF type.

The SBI may represent how a set of services is provided/exposed by a given NF. The one or more SBI request headers may include one or more headers (such as Message Priority header as described in 3GPP TS 23.501 V16.1.0.) of the service request sent via SBI.

The time range may correspond to any suitable time range such as busy hour (such as 8 am-10 am), maintenance time (such as 1 am-2 am), failure time, etc. The time range may span several minutes, hours, days, etc.

In an embodiment, the instruction field may include a set of actions that apply at least one policy to the processing of the service request. Some examples of actions might be adding preferred-locality for NF instance selection; replacing request uniform resource identifier (URI) with service entry URI; or dropping request due to overload, disaster etc.

As used herein, the service entry may be created on-demand either by the NF consumer, or by the NF producer. And some policies can be applied to the service entry. These policies will be used by SCP to forward request to which specific NF producer instance behind the service entry. The service entry can be created by NF consumer, which can be used to improve the efficiency of service usage. One possible efficiency improvement is to simplify the NF consumer discovery requests, reducing extra query request for each service session. For example, the NF consumer may create a service entry with a thinker granularity query parameter and leaves a further finer granularity selection to SCP. One example case, AMF handle the UE registration case. Normally, AMF may need to find one AUSF/UDM instance according to the UE specific SUPI. For every request with different SUPI, AMF has to find AUSF/UDM instance separately. With the service entry, AMF can create a service entry with NFtype=AUSF, and plmnID=local PLMN. The SCP will build related context for the AUSF service entry, i.e. the SCP will discovery all AUSF instances which serve the local PLMN, and build the internal mapping table for the SUPI to NF instances. The service entry also can be created by NF producer. For example, the NF producer may use the service entry for canary upgrading. The NF producer can create a service entry in SCP first, then the new installed NF producer can jointed to the service entry to share the traffic. The service entry can distribute the traffic according to pre-defined policy, e.g., 10% traffic going to the new instance and 90% traffic going to the legacy traffic. Another possible use case is to anchor the NF set via the service entry. In 5G, when the NF consumer wants to talk with a NF set instead of a specific NF instance, the service entry can be used as an anchor point to attract NF set related message, and forward to the real backend instance. The service entries can be discovered by NF consumer through the NRF in the same way to discover NF service. The NF consumer can make the discovery of service entries by querying NRF. The NRF responds to all matching service entries. The NF consumer sends a service request to the address found in service entry and SCP acts as a reverse proxy, which receives and forwards this request to the real backend NF producer instance. Service entries may be explicitly created by the NF consumer/producer or may be implicitly created by the SCP when the NF producer registers with the NRF via the SCP.

In an embodiment, the service entry is a resource of another SCP to configure how said another SCP as a portal to route the service request to a selected NF producer. In an embodiment, information regarding the service entry is added to said another SCP profile stored on a network repository function (NRF). In an embodiment, the service entry acts as a portal to anchor the service request to a specific NF set or NF service set or a specific NF or NF service instance.

In an embodiment, the set of actions may include at least one of selecting a signaling path for the service request based on at least one of end to end latency, locality, time range such as busy hour, SBI message priority, or slice information; replacing a uniform resource identifier (URI) of the service request with a URI of a service entry of the NF producer; or replacing an address of the NF producer with an address of an equivalent NF producer. The end to end latency may refer to the latency of a path from the NF consumer to the NF producer. The locality may indicate selecting a local NF producer. The time range can be used as part of "match" parameters, to limit the flow entry only valid in that time range. For example, in busy hour (8 am~10 am), such flow entry is valid, and in other time, this flow entry shall be ignored. The SBI message priority is defined in 3GPP. It's used to indicate this message's important/priority level. It's a part of the HTTP header. It can be used as parameter to be "match". The SCP can define the policy regarding how to handle those priorities. For example, in an overload case: only the high priority message may be forwarded, and the low priority message may be dropped. The slice information may indicate selecting a NF producer in the slice. The equivalent NF producer may refer to one of a group of interchangeable NF instances of the same type, supporting the same services and the same Network Slice(s). The NF instances in the same NF Set may be geographically distributed but have access to the same context data.

In an embodiment, replacing an address of the NF producer with an address of an equivalent NF producer may comprise replacing an address of the NF producer in a first data center with an address of another NF producer in a second data center, wherein the NF producer and said another NF producer belong to a same NF set; or replacing an address of the NF producer with high traffic load with an address of another NF producer with low traffic load.

In an embodiment, the flow table entry may further include a priority field and/or a time out field indicating maximum amount of time or idle time before the flow table entry is expired. In other embodiment, the flow table entry may further include other suitable field. The priority field may be used by the SCP to decide how to process the matched service request. For example, the priority field may indicate matching precedence of the flow table entry. When a service request can match multiple flow table entries, the flow table entry with the highest priority will be used by the SCP. In general, SCP may match the service request with the flow table entry in descending order of priority. The SCP may use the time out field to determine whether a time out of a flow table entry occurs. When a time out of a flow table entry occurs, the SCP may mark the flow table entry unavailable or delete it.

In an embodiment, the NF consumer or the SCP or other NF such as other SCP or NWDAF can update or modify or delete the flow table entry on the SCP.

At block 304, the SCP applies the flow table entry to match and process a service request from a NF consumer. The service request is to be served by a NF producer. For example, the SCP may match the service request with the match field of the flow table entry, and then apply a set of actions included in the matched flow table entry. In general, a flow table entry can match multiple service requests from the same or different NF consumer. In addition, a service request may match multiple flow table entries. In this case, a flow table entry with highest priority (if applicable) may be selected or the first matched flow table entry may be selected. When there is not a 100% matched flow table entry, the SCP will use the default flow table entry to handle it.

Figure 4:
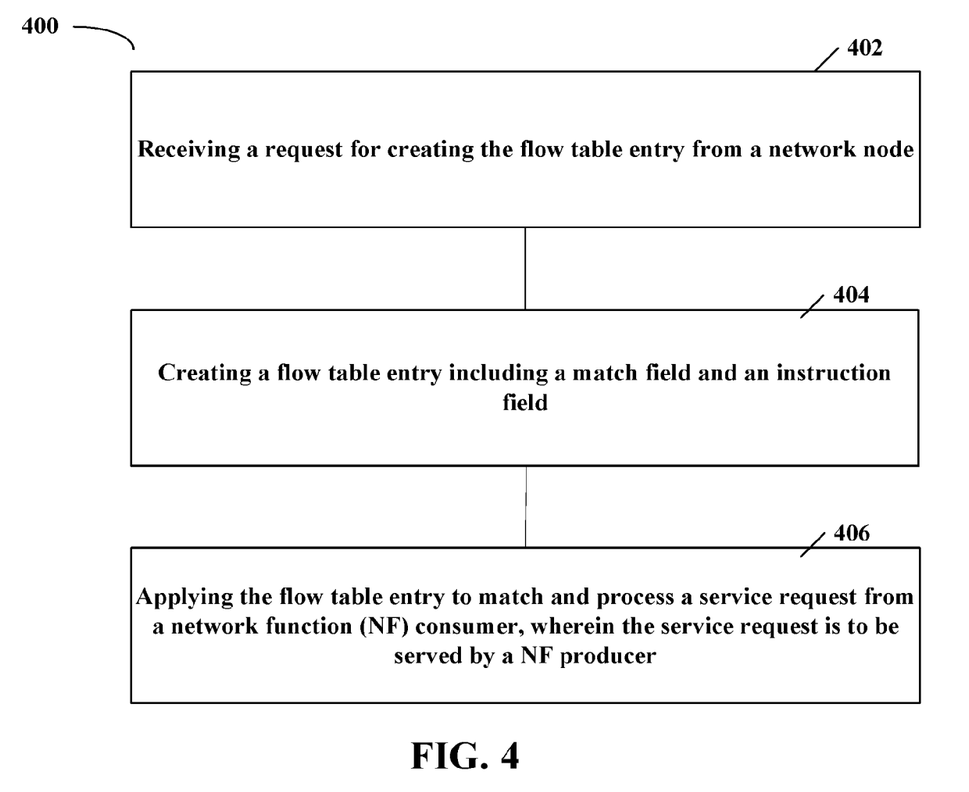
FIG. 4 shows a flowchart of a method according to another embodiment of the present disclosure.

FIG. 4 shows a flowchart of a method according to another embodiment of the present disclosure, which may be performed by an apparatus implemented in/at or communicatively coupled to a SCP. As such, the apparatus may provide means for accomplishing various parts of the method 400 as well as means for accomplishing other processes in conjunction with other components. For some parts which have been described in the above embodiments, detailed description thereof is omitted here for brevity.

At block 402, the SCP receives a request for creating the flow table entry from a network node. The network node can be any suitable network node for example the NFs as shown in FIG. 2. In an embodiment, the network node may include the NF consumer or a network data analytics function (NWDAF). The request may include the whole flow table entry or some parameters (such as the parameters which can be included in various fields of the flow table entry) that can be used by SCP to create the flow table entry.

Blocks 404 and 406 are similar to blocks 302 and 304 of FIG. 3.

Figure 5:
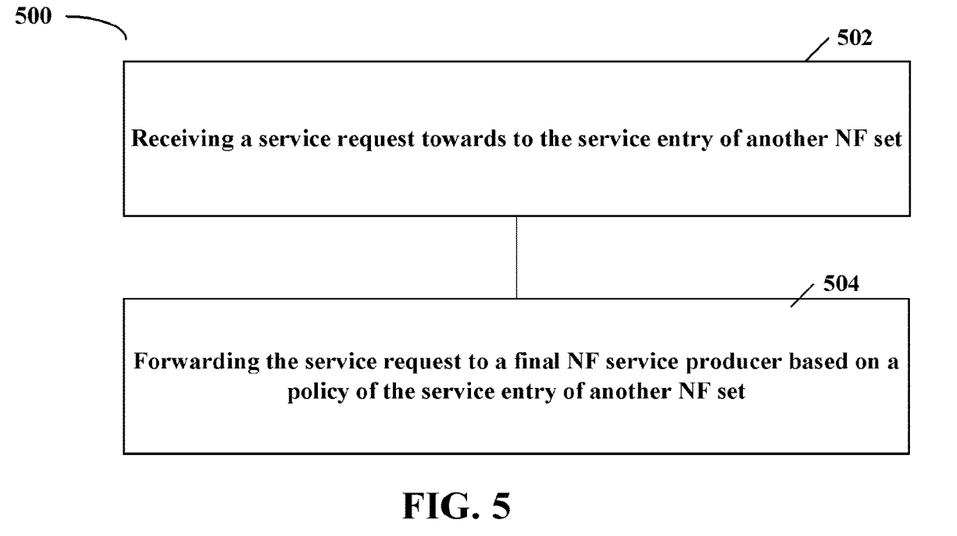
FIG. 5 shows a flowchart of a method according to another embodiment of the present disclosure.

FIG. 5 shows a flowchart of a method according to an embodiment of the present disclosure, which may be performed by an apparatus implemented in/at or communicatively coupled to a SCP. As such, the apparatus may provide means for accomplishing various parts of the method 500 as well as means for accomplishing other processes in conjunction with other components. For some parts which have been described in the above embodiments, detailed description thereof is omitted here for brevity. In this embodiment, the SCP is a service entry of another NF set.

At block 502, the SCP receives a service request towards to the service entry of another NF set. For example, the SCP may receive the service request from another SCP or a NF service consumer.

At block 504, the SCP may forward the service request to a final NF service producer based on a policy of the service entry of another NF set, for example, load balance, priority processing, etc.

Figure 6:
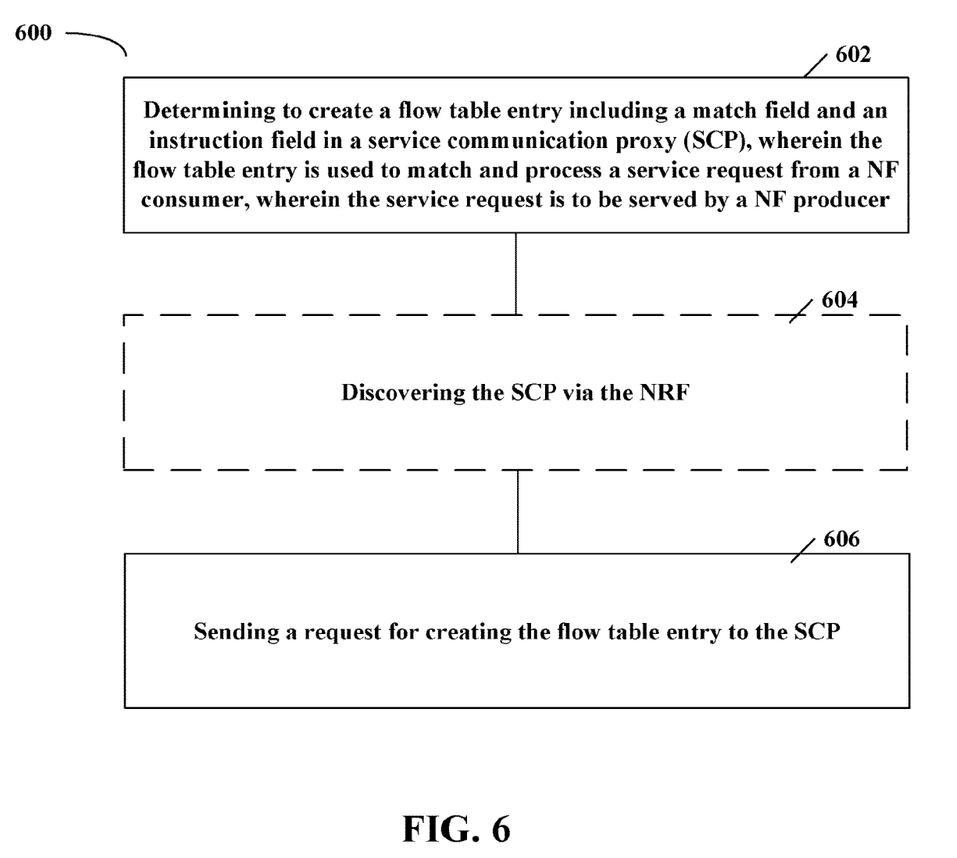
FIG. 6 shows a flowchart of a method according to another embodiment of the present disclosure.

FIG. 6 shows a flowchart of a method according to another embodiment of the present disclosure, which may be performed by an apparatus implemented in/at or communicatively coupled to a NF. As such, the apparatus may provide means for accomplishing various parts of the method 600 as well as means for accomplishing other processes in conjunction with other components. For some parts which have been described in the above embodiments, detailed description thereof is omitted here for brevity.

At block 602, the NF determines to create a flow table entry including a match field and an instruction field in a SCP. The flow table entry may be used to match and process a service request from a NF consumer. The service request is to be served by a NF producer. The NF may determine to create the flow table entry in various ways. For example, before the NF such as NF consumer sends a service request to a SCP, the NF may determine to create the flow table entry for the service request. The NF such as NF consumer or NWDAF may determine to create the flow table entry for example due to various events such as link failure or network node failure or quality of service (QoS) requirement or a new SCP is added in the network, etc. The NF may determine to create the flow table entry in advance for example even if the NF does not have any service request to be sent to the SCP.

At block 604 (optional), the NF may discover the SCP via the NRF. For example, when the SCP profiled has been registered or stored in the NRF, the NF may discover the SCP via the NRF.

At block 606, the NF sends a request for creating the flow table entry to the SCP. The request may include the whole flow table entry or some parameters (such as the parameters which can be included in various fields of the flow table entry) that can be used by SCP to create the flow table entry.

In an embodiment, the match field may include at least one of one or more discovery and selection parameters for discovering and selecting a NF service producer instance; one or more attributes of the NF consumer and/or the NF producer; one or more service based interface (SBI) request headers; or a time range.

In an embodiment, the one or more attributes of the NF consumer and/or the NF producer may include at least one of NF locality; NF capacity; NF load; or NF type.

In an embodiment, the instruction field may include a set of actions that apply at least one policy to the processing of the service request.

In an embodiment, the set of actions may include at least one of selecting a signaling path for the service request based on at least one of end to end latency, locality, busy hour, or slice information; replacing a uniform resource identifier (URI) of the service request with a URI of a service entry of the NF producer; or replacing an address of the NF producer with an address of an equivalent NF producer.

In an embodiment, replacing an address of the NF producer with an address of an equivalent NF producer may comprise replacing an address of the NF producer in a first data center with an address of another NF producer in a second data center, wherein the NF producer and said another NF producer belong to a same NF set; or replacing an address of the NF producer with high traffic load with an address of another NF producer with low traffic load.

In an embodiment, the service entry may be a resource of another SCP to configure how said another SCP as a portal to route the service request to a selected NF producer. In an embodiment, information regarding the service entry may be added to said another SCP profile stored on a network repository function (NRF).

In an embodiment, the service entry may act as a portal to anchor the service request to a specific NF set or NF service set or a specific NF or NF service instance.

In an embodiment, the flow table entry further may include a priority field and/or a time out field indicating maximum amount of time or idle time before the flow table entry is expired.

In an embodiment, the NF may include the NF consumer or a network data analytics function (NWDAF).

In an embodiment, the NF sends the request for creating the flow table entry in response to detecting all the NF producers in a data center is down.

In an embodiment, the SCP's profile may be stored in a network repository function (NRF).

Figure 7:
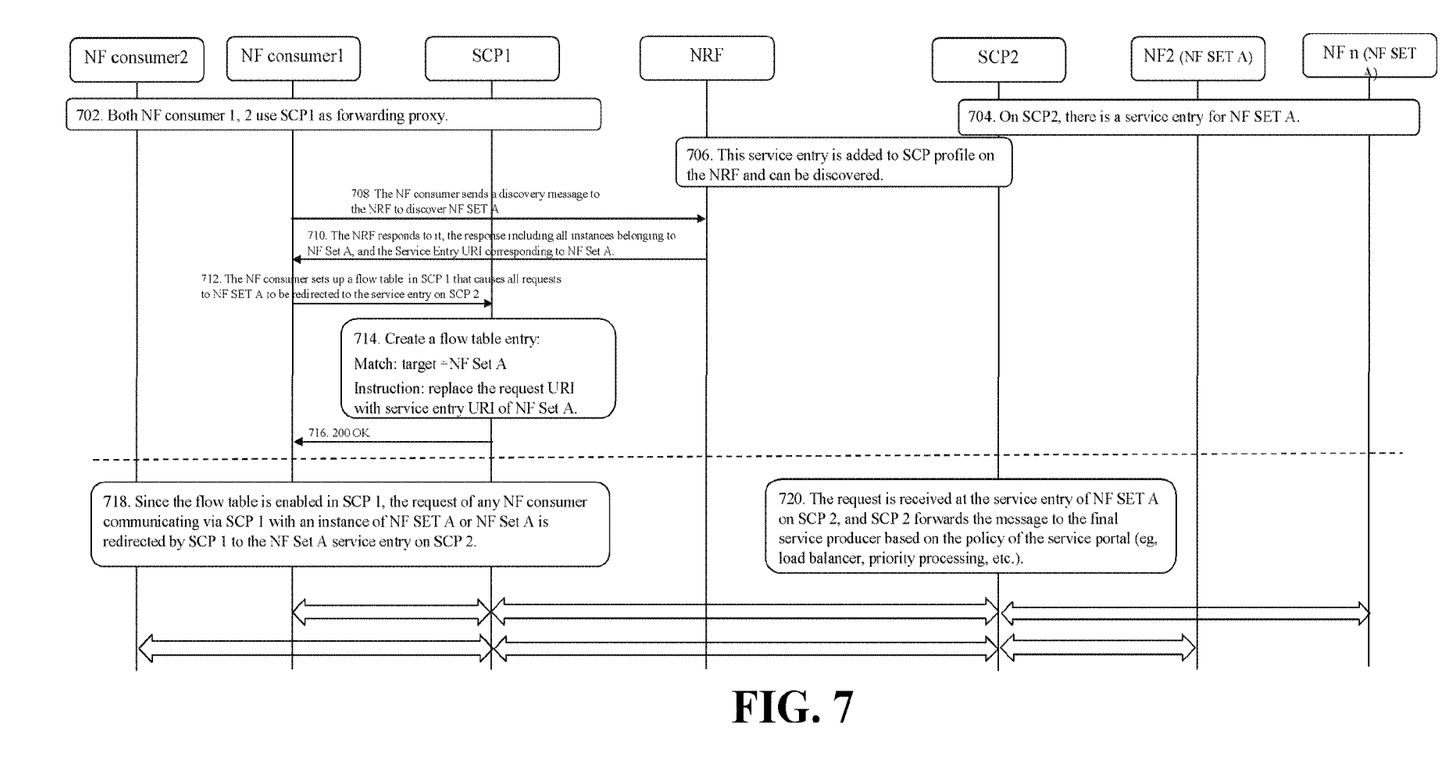
FIG. 7 shows a flowchart of a method according to another embodiment of the present disclosure.

FIG. 7 shows a flowchart of a method according to another embodiment of the present disclosure.

At step 702, both NF consumers 1 and 2 use SCP1 as a forwarding proxy. For example, NF consumers 1 and 2 can discovery SCP1 via NRF or SCP1 is pre-configured in NF consumers 1 and 2.

At step 704, there is a service entry for NF SET A on SCP2. For example, the service entry may be created on-demand either by the NF consumer or by the NF producer.

At step 706, this service entry is added to SCP profile on the NRF and can be discovered. For example, SCP may register or update its profile including the service entry information on NRF.

At step 708, the NF consumer 1 sends a discovery message to the NRF to discover NF SET A.

At step 710, the NRF responds to the NF consumer 1. The response may include all NF instances belonging to NF Set A, and the service entry URI corresponding to NF Set A.

At step 712, the NF consumer 1 can set a flow table entry in SCP 1, to optimize the subsequent similar requests to the service entry by default. The NF consumer sets up a flow table in SCP 1 that to make all requests to any instance in NF SET A to be redirected to the service entry on SCP 2.

The value for this flow table entry can be for example to optimize the signaling path based on some end to end latency measurement, or force the NF set access through the same anchor port for load balancing globally.

At step 714, the SCP 1 creates a flow table entry: Match: target belongs to "NF Set A" Instruction: replace the request URI with service entry URI of NF Set A.

At step 716, SCP 1 creates the flow table successful, and then responses 200 OK to NF consumer 1.

At step 718, since the flow table is enabled in SCP 1, the request of any NE consumer communicating via SCP 1 with an instance of NF SET A will be redirected by SCP 1 to the NE Set A service entry on SCP 2. For example, a new request to NF Set A from NF consumer 2 will be forcibly route to SCP 2 for further load balancing.

At step 720, the request is received at the service entry of NF SET A on SCP 2, and SCP 2 forwards the request to a final service producer based on the policy of the service portal (e.g., load balance, priority processing, etc.).

Figure 8:
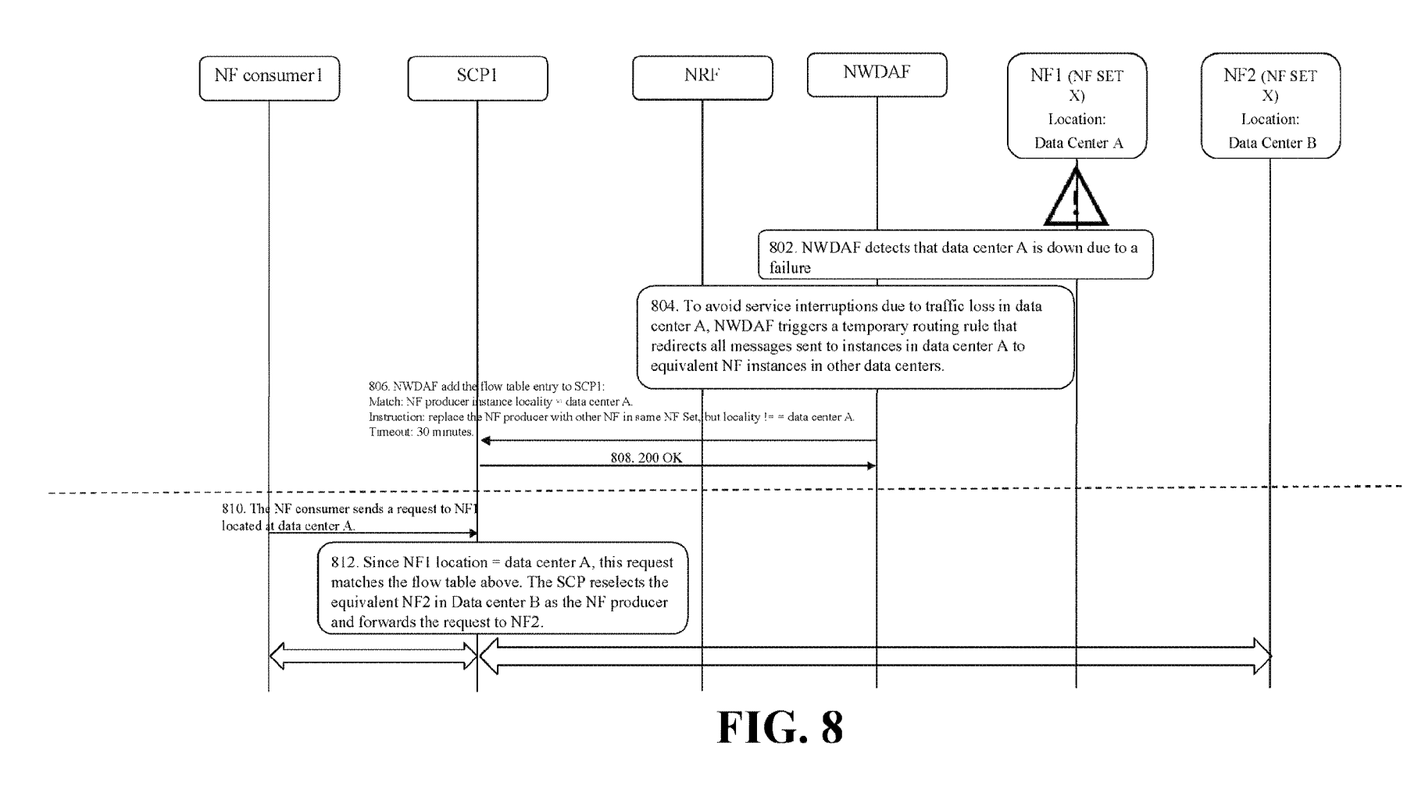
FIG. 8 shows a flowchart of a method according to another embodiment of the present disclosure.

FIG. 8 shows a flowchart of a method according to another embodiment of the present disclosure.

At step 802, NWDAF detects that data center A is down due to a failure.

NWDAF wants to handle this disaster problem. NWDAF can find other interworking SCPs in other data center via NRF, and trigger some actions to avoid service breaking. At step 804, to avoid service interruptions due to traffic loss in data center A, NWDAF triggers a temporary routing rule—"redirects all messages sent to instances in data center A to equivalent NF instances in other data centers".

At step 806, NWDAF adds the flow table entry to impacts SCPs, for example the SCP 1 in other data center, the flow table entry can be:
  Match: NF producer instance locality=data center A.
  Instruction: replace the NF producer with other NF in same NF Set, but locality !==data center A.
  Timeout: 30 minutes.

At step 808, NF consumer sends a request to NF producer in data center A via SCP 1.

At step 810, the SCP 1 selects the next hop of the request according to the flow table entry locally.

At step 812, since the flow table set in step 806 is matched, i.e. NH location=data center A. The SCP 1 reselects the equivalent NF2 in data center B as the NF producer and forwards the request to NF2.

Some steps as shown in FIGS. 7-8 are similar to the corresponding steps as described in 3GPP TS 23.502 V16.1.1, the disclosure of which is incorporated by reference herein in its entirety, except that the NRF may store the SCP profile and/or service entry information, SCP may create the route table entry and process the service request based on the route table entry, SCP may be a service entry of a NF set, etc., as described above.

In an embodiment, the flow table entry in SCP is introduced to manage SBI message flow, to make the SCP to be programmable. The flow control may be based on flow table entry. The flow table entry may include fields such as match, priority, instructions, and timeout. The match field can match various HTTP header fields. The match field can be attributes of the NF consumer or NF producer, e.g., locality, NF-type NF consumers. The match fields can be a time range such as busy hour (8 am-10 am). The priority field may be used to match precedence of the flow entry. The instruction field may be a set of actions that apply policies to the processing of incoming requests. The timeout field may be maximum amount of time or idle time before flow table entry is expired by the SCP.

Many advantages may be achieved by applying the proposed solution according to embodiments of the present disclosure. For example, some embodiments of the present disclosure can make the entire signaling network to be programmable and make the SBI message routing to be performed based on policies (such as flow table entry). Some embodiments of the present disclosure can bring a possibility to optimize message routing according pre-defined policy (such as flow table entry), that is, more than the selection of the target NF producer, but the message delivery path. Some embodiments of the present disclosure can select the signaling path according to end to end latency, locality, busy hour, slice, etc. Some embodiments of the present disclosure can make independent SCP units connected to each other and perceive each other. Some embodiments of the present disclosure can make SCPs to collaborate to achieve optimal routing. Some embodiments of the present disclosure can increase the resilience of network. In some embodiments of the present disclosure, in the case of congestion or failure etc., the signaling sent by the NF consumer can be redirected to the equivalent target without NF consumer/producer intervention. In some embodiments of the present disclosure provide non-intrusive overload protection via change the flow of SBI messages (e.g. re-select the equivalent target NF producer) to avoid congestion. Some embodiments of the present disclosure can transparently perform system migration and expansion for other nodes in the network.

Figure 9:
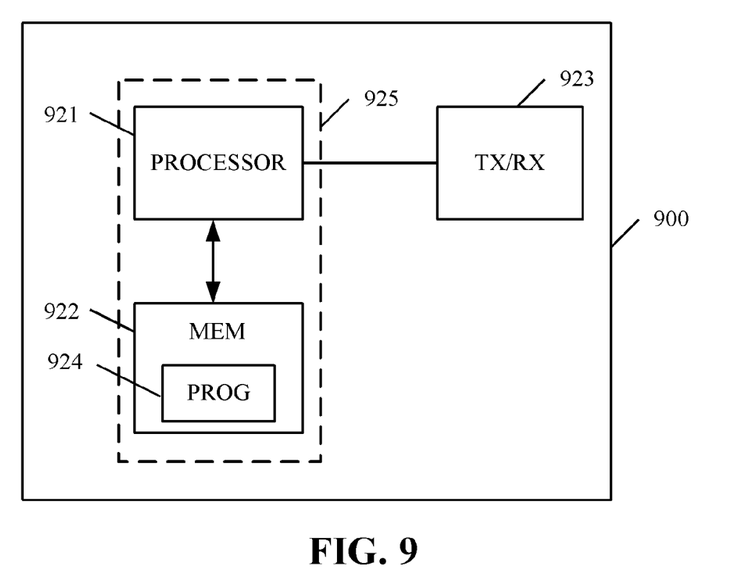
FIG. 9 is a block diagram showing an apparatus suitable for use in practicing some embodiments of the disclosure.

FIG. 9 is a block diagram showing an apparatus suitable for use in practicing some embodiments of the disclosure. For example, any one of the SCP or the NF such as NF service consumer or NWDAF as described above may be implemented through the apparatus 900.

The apparatus 900 comprises at least one processor 921, such as a DP, and at least one MEM 922 coupled to the processor 921. The apparatus 920 may further comprise a transmitter TX and receiver RX 923 coupled to the processor 921. The MEM 922 stores a PROG 924. The PROG 924 may include instructions that, when executed on the associated processor 921, enable the apparatus 920 to operate in accordance with the embodiments of the present disclosure. A combination of the at least one processor 921 and the at least one MEM 922 may form processing means 925 adapted to implement various embodiments of the present disclosure.

Various embodiments of the present disclosure may be implemented by computer program executable by one or more of the processor 921, software, firmware, hardware or in a combination thereof.

The MEM 922 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 921 may be of any type suitable to the local technical environment, and may include one or more of general purpose computers, special purpose computers, microprocessors, digital signal processors DSPs and processors based on multicore processor architecture, as non-limiting examples.

In an embodiment where the apparatus is implemented as or at the SCP, the memory 922 contains instructions executable by the processor 921, whereby the SCP operates according to any step of any of the methods related to the SCP as described above.

In an embodiment where the apparatus is implemented as or at the NF, the memory 922 contains instructions executable by the processor 921, whereby the NF operates according to any step of the methods related to the NF as described above.

Figure 10:
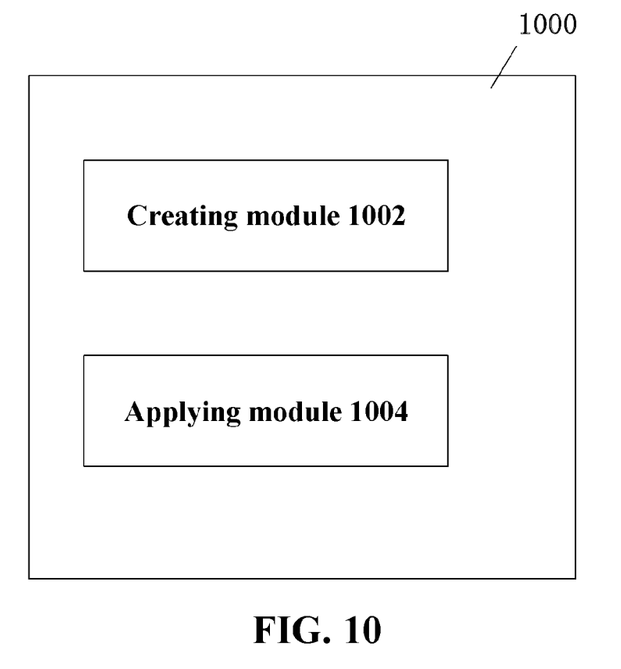
FIG. 10 is a block diagram showing a SCP according to an embodiment of the disclosure.

FIG. 10 is a block diagram showing a SCP according to an embodiment of the disclosure. As shown, the SCP 1000 comprises a creating module 1002 and an applying module 1004. The creating module 1002 may be configured to create a flow table entry including a match field and an instruction field. The applying module 1004 may be configured to apply the flow table entry to match and process a service request from a network function (NF) consumer, wherein the service request is to be served by a NF producer.

Figure 11:
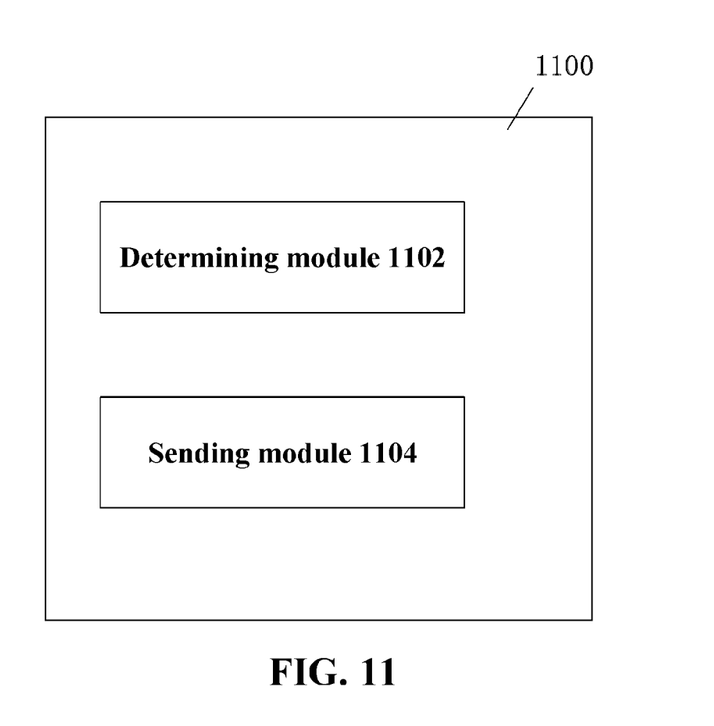
FIG. 11 is a block diagram showing a NF according to an embodiment of the disclosure.

FIG. 11 is a block diagram showing an NF according to an embodiment of the disclosure. As shown, the NF 1100 comprises a determining module 1102 and a sending module 1104. The determining module 1102 may be configured to determine to create a flow table entry including a match field and an instruction field in a service communication proxy (SCP). The flow table entry is used to match and process a service request from a NF consumer. The service request is to be served by a NF producer. The sending module 1104 may be configured to send a request for creating the flow table entry to the SCP.

According to an aspect of the disclosure it is provided a computer program product being tangibly stored on a computer readable storage medium and including instructions which, when executed on at least one processor, cause the at least one processor to carry out any of the methods related to the SCP as described above.

According to an aspect of the disclosure it is provided a computer program product being tangibly stored on a computer readable storage medium and including instructions which, when executed on at least one processor, cause the at least one processor to carry out any of the methods related to the NF as described above.

According to an aspect of the disclosure it is provided a computer-readable storage medium storing instructions which when executed by at least one processor, cause the at least one processor to carry out any of the methods related to the SCP as described above.

According to an aspect of the disclosure it is provided a computer-readable storage medium storing instructions which when executed by at least one processor, cause the at least one processor to carry out any of the methods related to the NF as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform one or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method at a service communication proxy (SCP), comprising:
   creating a flow table entry including a match field and an instruction field; and
   applying the flow table entry to match and process a service request from a network function (NF) consumer, wherein the service request is to be served by a NF producer, wherein the SCP is a service entry of another NF set, and the method further comprises:
   receiving a service request towards to the service entry of another NF set; and
   forwarding the service request to a final NF service producer based on a policy of the service entry of another NF set.

2. The method of claim 1, wherein the match field includes at least one of:
   one or more discovery and selection parameters for discovering and selecting a NF service producer instance;
   one or more service based interface (SBI) request headers;
   one or more attributes of the NF consumer and/or the NF producer; or
   a time range.

3. The method of claim 1, wherein the instruction field includes a set of actions that apply at least one policy to the processing of the service request.

4. The method of claim 3, wherein the set of actions includes at least one of:
   selecting a signaling path for the service request based on at least one of end to end latency, locality, time range, service based interface (SBI) message priority, or slice information;
   replacing a uniform resource identifier (URI) of the service request with a URI of a service entry of the NF producer; or
   replacing an address of the NF producer with an address of an equivalent NF producer.

5. The method of claim 4, wherein replacing an address of the NF producer with an address of an equivalent NF producer comprises:
   replacing an address of the NF producer in a first data center with an address of another NF producer in a second data center, wherein the NF producer and said another NF producer belong to a same NF set; or
   replacing an address of the NF producer with high traffic load with an address of another NF producer with low traffic load.

6. The method of claim 4, wherein the service entry is a resource of another SCP to configure how said another SCP as a portal to route the service request to a selected NF producer.

7. The method of claim 6, wherein information regarding the service entry is added to said another SCP profile stored on a network repository function (NRF).

8. The method of claim 4, wherein the service entry acts as a portal to anchor the service request to a specific NF set or NF service set or a specific NF or NF service instance.

9. The method of claim 1, wherein the flow table entry further includes a priority field and/or a time out field indicating maximum amount of time or idle time before the flow table entry is expired.

10. The method of claim 1, further comprising:
receiving a request for creating the flow table entry from a network node.

11. A method at a network function (NF), comprising:
determining to create a flow table entry including a match field and an instruction field in a service communication proxy (SCP), wherein the flow table entry is used to match and process a service request from a NF consumer, wherein the service request is to be served by a NF producer; and
sending a request for creating the flow table entry to the SCP, wherein the service entry is a resource of another SCP to configure how said another SCP as a portal to route the service request to a selected NF producer, and wherein information regarding the service entry is added to said another SCP profile stored on a network repository function (NRF).

12. The method of claim 11, wherein the match field includes at least one of
one or more discovery and selection parameters for discovering and selecting a NF service producer instance;
one or more attributes of the NF consumer and/or the NF producer;
one or more service based interface (SBI) request headers; or
a time range.

13. The method of claim 12, wherein the one or more attributes of the NF consumer or the NF producer includes at least one of
NF locality;
NF capacity;
NF load; or
NF type.

14. The method of claim 11, wherein the instruction field includes a set of actions that apply at least one policy to the processing of the service request.

15. The method of claim 14, wherein the set of actions includes at least one of
selecting a signaling path for the service request based on at least one of end to end latency, locality, busy hour, or slice information;
replacing a uniform resource identifier (URI) of the service request with a URI of a service entry of the NF producer; or
replacing an address of the NF producer with an address of an equivalent NF producer.

16. The method of claim 15, wherein replacing an address of the NF producer with an address of an equivalent NF producer comprises:
replacing an address of the NF producer in a first data center with an address of another NF producer in a second data center, wherein the NF producer and said another NF producer belong to a same NF set; or
replacing an address of the NF producer with high traffic load with an address of another NF producer with low traffic load.

17. The method of claim 15, wherein
the service entry acts as a portal to anchor the service request to a specific NF set or NF service set or a specific NF or NF service instance, or
the flow table entry further includes a priority field and/or a time out field indicating maximum amount of time or idle time before the flow table entry is expired.

18. An apparatus, comprising:
a processor; and
a memory coupled to the processor, said memory containing instructions executable by said processor, wherein said apparatus is configured to:
create a flow table entry including a match field and an instruction field in a service communication proxy (SCP); and
apply the flow table entry to match and process a service request from a network function (NF) consumer, wherein the service request is to be served by a NF producer, wherein the service entry is a resource of another SCP to configure how said another SCP as a portal to route the service request to a selected NF producer, and wherein information regarding the service entry is added to said another SCP profile stored on a network repository function (NRF).

* * * * *